(12) United States Patent  
Shimizu et al.

(10) Patent No.: US 6,679,350 B2  
(45) Date of Patent: Jan. 20, 2004

(54) ELECTRIC POWER STEERING APPARATUS

(75) Inventors: Yasuo Shimizu, Wako (JP); Atsuhiko Yoneda, Wako (JP); Hisao Asaumi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/116,398

(22) Filed: Apr. 3, 2002

(65) Prior Publication Data

US 2002/0166716 A1 Nov. 14, 2002

(30) Foreign Application Priority Data

May 8, 2001 (JP) .................................. 2001-137586

(51) Int. Cl.[7] .................................................. B62D 5/04
(52) U.S. Cl. ........................................ 180/446; 701/41
(58) Field of Search ................................ 180/443, 446, 180/444; 701/41, 42, 43

(56) References Cited

U.S. PATENT DOCUMENTS 5,033,565 A * 7/1991 Abukawa et al. .......... 180/79.1
6,161,068 A * 12/2000 Kurishige et al. ............ 701/41
6,415,215 B1 * 7/2002 Nishizaki et al. ............ 701/70
6,427,105 B1 * 7/2002 Matsushita .................. 701/41
6,504,336 B2 * 1/2003 Sakamaki ................... 318/727

FOREIGN PATENT DOCUMENTS

JP            4-27743          7/1992

* cited by examiner

Primary Examiner—Avraham Lerner  
(74) Attorney, Agent, or Firm—Merchant & Gould P.C.

(57) ABSTRACT

An electric power steering apparatus capable of controlling a brushless motor accurately and providing excellent steering feeling as well as maintaining the reliability of a control means. The electric power steering apparatus includes a motor, a steering torque detection means (steering torque sensor), a motor rotation detection means, a motor current detection means, a target current setting means (target current setting sub-unit), a drive control means (drive control sub-unit), and a motor drive means (motor drive circuit). The control means (control unit) including a target current setting means, and a drive means (drive unit), which a motor rotation signal enters, including the drive control means and the motor drive means are provided. And the control means and the drive means are placed apart from each other and connected by a communication line electrically.

8 Claims, 6 Drawing Sheets

ELECTRIC POWER STEERING APPARATUS

FIELD OF THE INVENTION

The present invention relates to an electric power steering apparatus, in which motor power acts on a power steering system directly so that the steering force of a driver is reduced.

BACKGROUND OF THE INVENTION

An electric power steering apparatus employs the driving force of a motor directly to assist the steering force of a driver. In addition to the motor, the electric power steering apparatus is equipped with a steering torque detection means for detecting steering torque acting on a steering system, a control means for controlling the motor and a motor drive means for driving the motor. The motor drive means is composed of a plural of FET's (Field Effect Transistor) etc., which run the current of several tens of amperes in order to drive the motor to generate heat. If the control means is placed near the motor drive means, the reliability of the control means may possibly be degraded, since an internal analogue circuit to shape an inputted steering torque signal is affected by the heat.

The applicant disclosed in Japanese Utility Model Gazette 4-27743 an electric power steering apparatus of rack and pinion type, in which a control circuit (control means) and a torque detector were placed apart from a drive circuit (motor drive means) across a rack axis. The control circuit thus avoids the effect of heat of the drive circuit. However, this power steering apparatus employs a DC (Direct Current) brush motor as a motor, encountering a possible case of the brush abrasion due to the secular change. Once the brush is abraded, it may cause an increase in the voltage drop between the brush and the commutator or the unstableness of the motor electric current. Thus, the steering feeling of a driver may possibly be degraded due to the motor output drop or the unstableness of the motor electric current. Further, its moment of inertia is large, for the brush motor has a rotor including a steel core with winding. The large moment of inertia causes difficulty in handling a steering wheel for fine steering, since the moment of inertia acts on the steering wheel. It may possibly lead to such a problem as the difficulty of fine steering of a steering wheel on an expressway, the scratching feeling during steering back or the degradation of steering feeling.

An electric power steering which employs a brushless motor has been proposed. A brushless motor has a three-phase winding as an outer stator and a plurality of permanent magnets as an inner rotor. The three-phase winding is on-off controlled according to the rotation angle of the inner rotor, thus rotationally driving the inner rotor. A brushless motor is free from the degradation of steering feeling due to the brush abrasion mentioned above, for it needs no brushes. Also a brushless motor is immune to the degradation of steering feeling due to the large moment of inertia mentioned before, since magnets can be employed for the inner rotor of the brushless motor to reduce the moment of inertia.

The prior control unit of an electric power steering apparatus with a brushless motor will be described referring to FIG. 6. A control unit 100 outputs a motor control signal VO to a motor drive circuit 101 in order to PWM (Pulse Width Modulation) drive or turn off the six FET's, which form the motor drive circuit 101 that drives a brushless motor 102. The control unit 100 sets a target current signal according to a steering torque signal T of a steering torque sensor TS and a vehicle speed signal V of a vehicle speed sensor VS in a target current setting sub-unit 100a, and also a compensation current signal accounting for inertia control and damping control with the steering torque signal T and the vehicle speed signal V in a compensation current setting sub-unit 100b. Further, the control unit 100 performs addition or subtraction of the compensation current signal for the target current signal in a compensator 100c. The control unit 100 generates the motor control signal VO according to the target current signal compensated in a drive control sub-unit 100d, a motor electric current signal IMO detected by a motor electric current detection means 103 and a motor rotation signal PMO detected by a motor rotation detection means 104. Then in the motor drive circuit 101, the FET's start PMW driving according to the motor control signal VO and impose voltage VM on the three-phase winding of the brushless motor 102. In this connection, the motor drive circuit 101 generates heat since the FET's run several tens of amperes. Therefore, when the brushless motor 102 is employed, the control unit 100 is also placed apart from the motor drive circuit 101 to prevent the degradation of reliability due to heat according to the arrangement disclosed in Japanese Utility Model Gazette 4-27743.

In the electric power steering apparatus according to Japanese Utility Model Gazette 4-27743, the signal flow (or supplied current flow) starting with the motor rotation signal PMO will be: the motor rotation detection means 104→the control unit 100→the motor drive circuit 101→the brushless motor 102, resulting in a long transmission path. Especially, the control unit 100 and the motor drive circuit 101 are placed apart each other to avoid the heat effect, and the transmission path between them is longer for that. Thus the signal starting with the motor rotation signal PMO takes time to pass through the transmission path, thereby involving phase lag. The brushless motor 102 requires an accurate on-off control for its drive according to the rotation angle of an inner rotor. However, in the arrangement of the electric power steering apparatus mentioned above, the signal starting with the motor rotation signal PMO involves phase lag. Thus the brushless motor 102 may not possibly be controlled accurately, since it is controlled by the rotation phase of the inner rotor including phase lag. As a result, the output of the brushless motor 102 oscillates or exhibits unstableness, which may possibly lead to hunting of the steering wheel or the degradation of steering feeling.

SUMMARY OF THE INVENTION

The object of the present invention is to provide an electric power steering apparatus, which is capable of controlling a brushless motor accurately and giving excellent steering feeling as well as maintaining the reliability of the control means.

The present invention to address the above issues provides an electric power steering apparatus, comprising: a brushless motor for adding assist torque to a steering system; a steering torque detection means for detecting steering torque acting on the steering system and outputting a steering torque signal; a motor rotation detection means for detecting a rotation of the brushless motor and outputting a motor rotation signal; a motor current detection means for detecting a motor current, which flows in the brushless motor, and outputting a motor current signal; a target current setting means for setting a target current based on at least the steering torque signal and outputting a target current signal; a drive control means for outputting a motor control signal based on at least the target current signal, the motor current signal and the motor rotation signal; and a motor drive means for driving the brushless motor based on the motor control signal, wherein the target current setting means and the drive control means are placed apart and electrically connected each other with a communication line.

The electric power steering apparatus according to the present invention enables the target current setting by the control means without heat effect, since the control means including parts, which should be free from heat effect, such as the analogue circuit for shaping the steering torque signal sent from the steering torque detection means, is placed apart from the drive means including the heat generating motor drive means. As the motor rotation signal enters the drive means in this electric power steering apparatus, the signal flow starting with the motor rotation signal is: the motor rotation detection means→the drive means→the motor, resulting in a short transmission path. Thus the electric power steering apparatus allows an accurate controlling of the motor (brushless motor) without phase lag in the signal starting with the motor rotation signal.

Further, the present invention provides the electric power steering apparatus, wherein the drive control means and the motor drive means are placed adjacent to the motor.

This electric power steering apparatus enables a short lead wire, which connects the motor drive means and the motor electrically, since the drive means is placed adjacent to the motor. Therefore, comfortable steering feeling can be attained by eliminating the voltage drop of the lead wire and the output drop of the motor while the motor is on. The shorter the lead wire is, the better it will be, when the drive means is placed adjacent to the motor. However, it may be acceptable if the drive means and the motor are placed close enough so that the effect of voltage drop of the lead wire is negligible, taking into account the size, the shape and the shape of mounting place of the drive means and the motor.

DESCRIPTION OF THE PREFERRED EMBODIMENTS

The embodiment of the electric power steering apparatus according to the present invention will now be described referring to the accompanying drawings.

The electric power steering apparatus according to the present invention employs a brushless motor, thereby avoiding the degradation of steering feeling caused by the brush abrasion and the large moment of inertia of a DC brush motor. This electric power steering apparatus also enables both the prevention of the degradation of steering feeling due to heat and the prevention of the phase lag in the signal starting with the motor rotation signal, by placing the control means (the target current setting means) apart from the drive means (the drive control means and the motor drive means). Further, this electric power steering apparatus restrains the voltage drop of the lead wire as much as possible by positioning the drive means adjacent to the motor.

In the electric power steering apparatus according to the embodiment, the control unit for setting the target current to be supplied to the brushless motor and the drive unit for driving the brushless motor according to the target current are placed apart each other, and connected by a wire harness. The control unit, which is placed along a pinion axis, includes an analogue circuit for shaping a steering torque signal sent from a steering torque sensor (a steering torque detection means), a one-tip microcomputer for performing various computations and memories for storing various maps provided for setting a target current and a compensation current. On the other hand, the drive unit includes a one-tip microcomputer for performing various computations and a motor drive circuit composed of a bridge circuit of 6 FET's, and is placed adjacent to a brushless motor.

Figure 1:
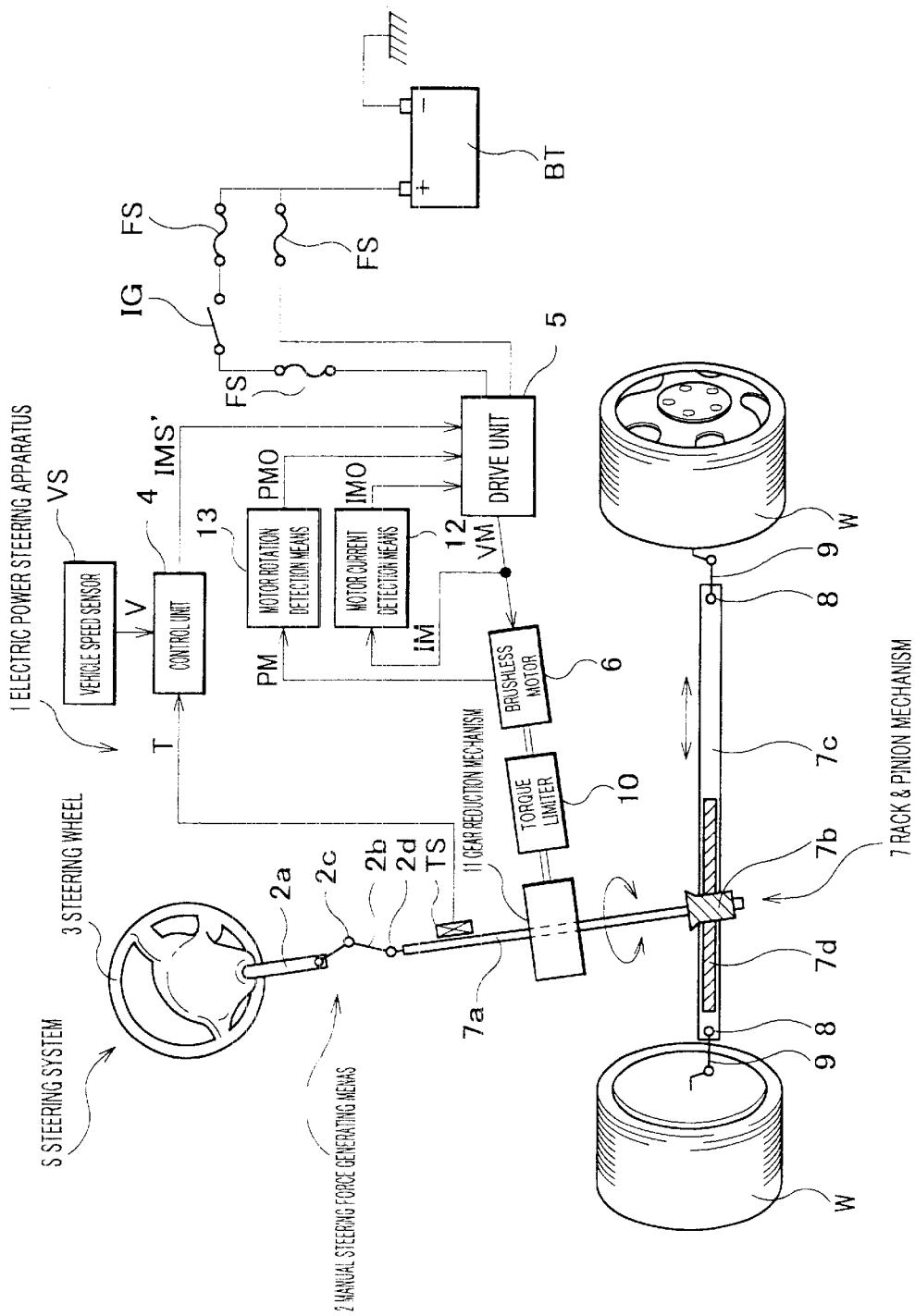
FIG. 1 is a conceptual view illustrating the electric power steering apparatus according to the embodiment of the present invention.

The overall structure of the electric power steering apparatus will be described referring to FIG. 1. FIG. 1 is a conceptual figure of the electric power steering apparatus.

An electric power steering apparatus 1 is equipped in a steering system S, which ranges from a steering wheel 3 to steered wheels W, W, and assists the steering force of a manual steering force generating means 2. In the electric power steering apparatus 1, a drive unit 5 generates a motor voltage VM according to a post-compensation target current signal IMS' of a control unit 4, and reduces the manual steering force of the manual steering force generating means 2 by driving a brushless motor 6 to generate assist torque (assist steering force) with the motor voltage VM.

In the present embodiment, the control unit 4 refers to the control means, the drive unit 5 refers to the drive means and the brushless motor 6 refers to the motor according to the claims of the present invention.

In the manual steering force generating means 2, a pinion axis 7a of a rack & pinion mechanism 7 is connected through a connecting axis 2b to a steering axis 2a, which is integrated with the steering wheel 3. The connecting axis is equipped with universal joints 2c, 2d at its both ends. The rack & pinion mechanism 7 is so arranged that a rack 7d to engage with a pinion 7b of the end of the pinion axis 7a is provided on a rack axis 7c and converts the rotational movement of the pinion axis 7a to the lateral (the direction of a vehicle width) reciprocating action by the engagement of the pinion 7b and the rack 7d. Further, right and left front wheels W, W as steered wheels are connected to both ends of the rack axis 7c through ball joints 8, 8 and tie rods 9, 9.

The electric power steering apparatus 1 has the brushless motor 6 in order to generate assist torque. The brushless motor 6 adds the assist torque to the pinion axis 7a through a torque limiter 10 and a gear reduction mechanism.

The electric power steering apparatus 1 transfers the steering torque, which is added by a driver to the steering wheel 3, to the pinion axis 7a, and the assist torque generated by the brushless motor 6 to the pinion axis 7a depending on the steering torque, thereby steering the steered wheels W, W with the rack & pinion mechanism 7.

Signals V and T detected respectively by a vehicle speed sensor VS and a steering torque sensor TS enter the control unit 4. The control unit 4 computes the post-compensation target current signal IMS' based on the detected signals V and T, which is the target current to be supplied to the brushless motor 6, and sends the post-compensation target current signal IMS' to the drive unit 5. The control unit 4 is connected electrically to the drive unit 5 by a wire harness WH (see FIG. 2).

In this embodiment, the steering torque sensor TS refers to the steering torque detection means and the wire harness WH refers to the communication line according to the claims of the present invention.

Signals IMO and PMO detected respectively by a motor current detection means 12 and a motor rotation detection means 13 enter the drive unit 5. The drive unit 5 generates a motor control signal VO with a drive control sub-unit 50 according to those detected signals IMO and PMO, and imposes a motor voltage VM on the brushless motor 6 with a motor drive circuit 51 according to the motor control signal VO (see FIG. 5). The drive unit 5 is connected to a battery BT through fuses FS, FS and an ignition switch IG as well as directly connected to it through a fuse FS, thereby supplied with the battery power (12 V). The drive unit 5 generates a constant voltage (5 V) converting from battery voltage (12 V) and supplies the control unit 4 with this constant voltage.

The vehicle speed sensor VS detects the vehicle speed as a number of pulses per time and sends an analogue electrical signal corresponding to the detected number of pulses to the control unit 4 as the vehicle speed signal V. The vehicle speed sensor VS may be either a sensor dedicated to the electric power steering apparatus 1 or a common vehicle speed sensor of another system.

The steering torque sensor TS detects the magnitude and direction of the manual steering torque of a driver sensing electromagnetically the magnetostriction effect depending on the torque acting on the pinion axis 7a with an electrical coil. The steering torque sensor TS sends an analogue electrical signal corresponding to the detected steering torque to the control unit 4 as the steering torque signal T. The steering torque signal T includes the information on steering torque defining the magnitude and the torque direction defining the direction.

The motor current detection means 12 has resisters or Hall elements connected in series to the brushless motor 6 and detects a motor current IM, which is the actual current flowing into the brushless motor 6. The motor current detection means 12 feedbacks (negative feedback) the motor current signal IMO corresponding to the motor current IM to the driving unit 5. The motor current signal IMO is a three-phase AC (Alternating Current) signal, including a motor current value showing the magnitude of the actual current flowing into the winding of each phase of the brushless motor 6 and the information on the phase of winding through which the motor current flows of the three-phase windings of the brushless motor 6.

Figure 4:
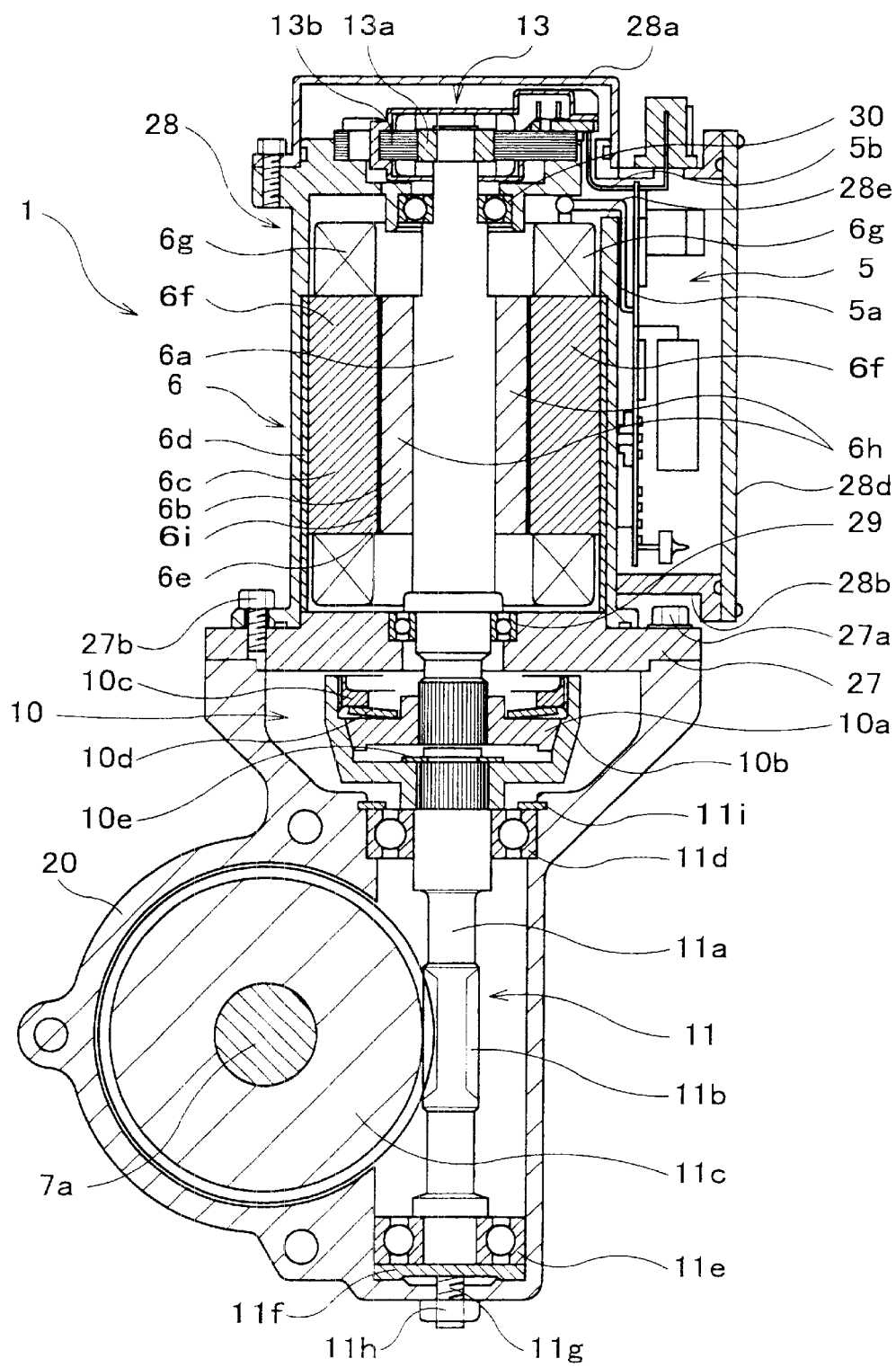
FIG. 4 is a plane cross section view taken along the line IV—IV in FIG. 2.

The motor rotation detection means 13 is a resolver for detecting the motor rotation angle PM of the inner rotor 6b of the brushless motor 6, and placed at one end of the brushless motor 6 (see FIG. 4). The motor rotation angle detection means 13 is equipped with a layered core rotor 13a fixed to one end of a motor axis 6a and a detection device (combination of an exciting coil and a detection coil) 13b for detecting the rotation angle of the layered core rotor 13a magnetically (see FIG. 4). The motor rotation detection means 13 sends the motor rotation signal PMO corresponding to the motor rotation angle PM to the drive unit 5. The motor rotation signal PMO includes the information on the rotational direction and angle of the inner rotor 6b of the brushless motor 6, which is composed of two excitation signals, two cosine signals and two sinusoidal signals.

Figure 2:
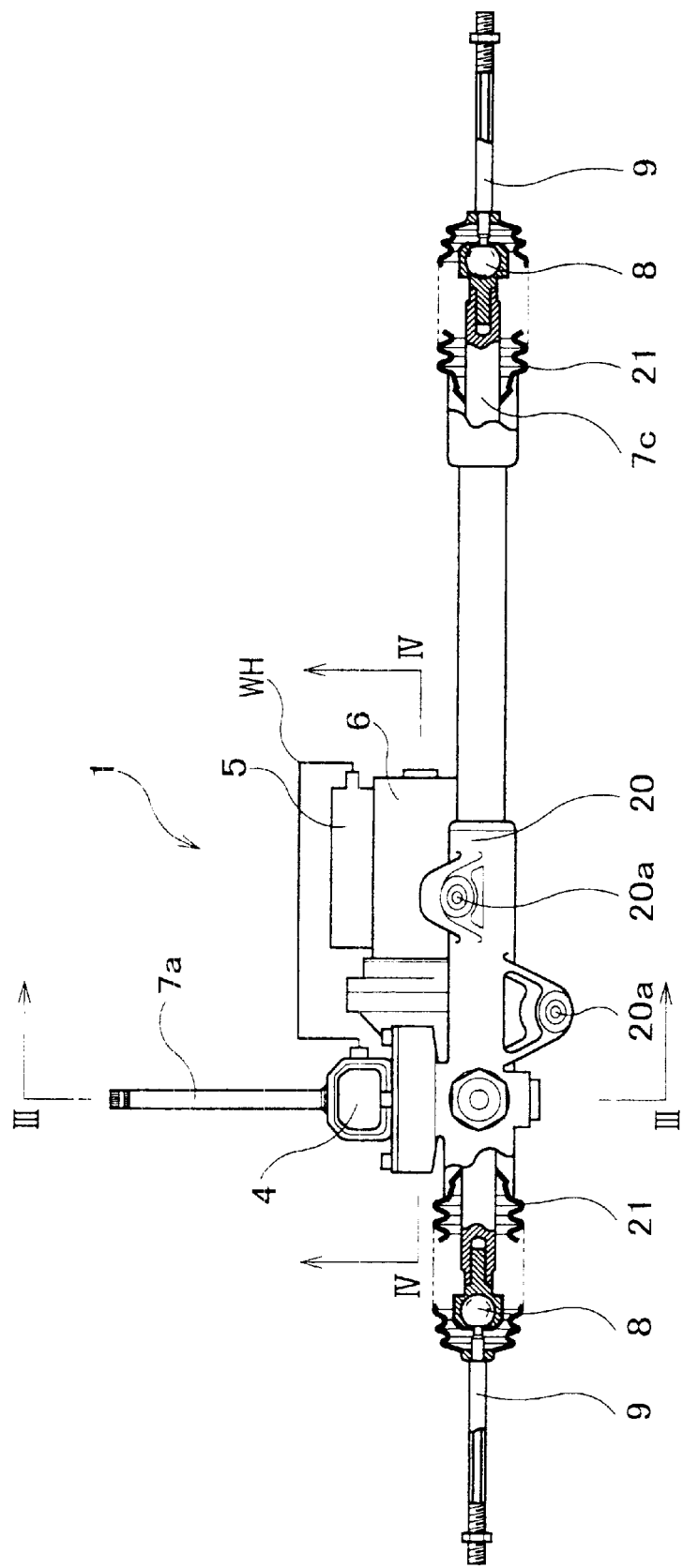
FIG. 2 is a front view illustrating the overall structure of the electric power steering apparatus according to the embodiment of the present invention.
Figure 3:
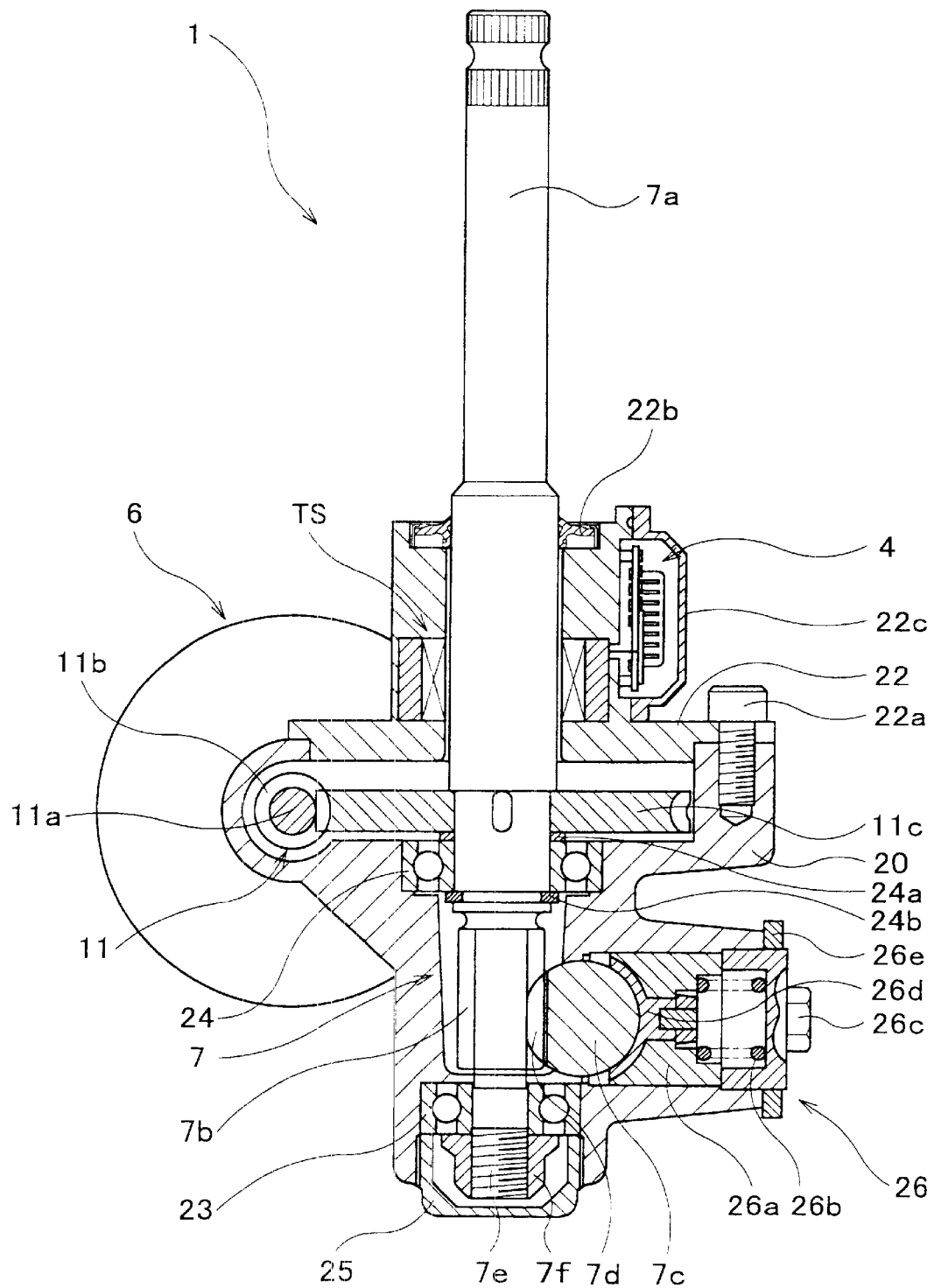
FIG. 3 is a cross section view taken along the line III—III in FIG. 2.

The internal structure of the electric power steering apparatus 1 will be described referring to FIGS. 2 through 4. FIG. 2 is a front view showing the overall structure of the electric power steering apparatus. FIG. 3 is a cross section view taken along the line III—III in FIG. 2. FIG. 4 is a plane cross section view taken along the line IV—IV.

As shown in FIG. 2, the electric power steering apparatus 1 houses the rack axis 7a slidable in the axial direction in a housing 20, which extends in the direction of the vehicle width. The rack axis 7c has the ball joints 8, 8 fixed with screws at the both ends of the axis extending from the housing 20. And the right and left tie rods 9, 9 are connected to the ball joints 8, 8. The housing 20 has brackets 20a, 20a used for mounting it on a vehicle (not shown). Dust seal boots 21, 21 are provided for both ends of the rack axis 7c to cover the rack axis 7c.

As shown in FIGS. 3 and 4, the rack & pinion mechanism 7, the torque limiter 10 and the gear reduction mechanism 11 are contained in the housing 20. The upper opening of the housing 20 is closed by a lid 22, which is fixed by a lid mounting bolt 22a. The lid 22 has the pinion axis 7a inserted in the center and the steering torque sensor TS mounted inside. An oil seal 22b is provided at the end of the lid 22. Further, on the outer side surface of the lid 22 is attached a housing case 22c, in which the control unit 4 is placed.

The housing 20 supports the lower end and the center of the pinion axis 7a rotationally free with two bearings 23 and 24. A spacer 24a is placed between the bearing 24 and a worm wheel 11c. A holding ring 24b is placed between the bearing 24 and the pinion 7b. The pinion 7b is integrated with the lower portion of the pinion axis 7a and a threaded portion 7e is provided at the lower end of the pinion axis 7a. The upper end of the pinion axis 7a protrudes from the lid 22. A nut 7f is fastened to the threaded portion 7e, restricting the pinion axis 7a from displacing in the axial direction. A cap nut 25 is mounted on the lowest end of the housing 20 covering the nut 7f.

A rack guide 26 is provided on the rack axis 7c side of the housing 20. The rack guide 26 includes a guide member 26a for touching the rack axis 7c from the opposite side of the rack 7d and an adjusting bolt 26c for pressing the guide member 26a through a compression spring 26b. In the rack guide 26, the adjusting bolt 26c screwed into the housing 20 presses the guide member 26a through the compression spring 26b, and thereby the guide member 26a presses the rack 7d to the pinion 7b. The guide member 26a presses the rack axis 7c with a contact member 26d sliding on the back of the rack axis 7c. The rack guide 26 is mounted on the housing 20 by a rock nut 26e.

As shown in FIG. 4, the side opening of the housing 20 is closed with a lid 27, which is fixed by a lid mounting bolt 27a. On the lid 27 opposite of the housing 20 is mounted a motor case 28 by a motor case mounting bolt 27b. The motor case 28 is of a cylinder with a base and houses the brushless motor 6. The brushless motor 6 extends a motor axis 6a inside the housing 20. The lid 27 and the motor case 28 support the motor axis 6a rotationally free with bearings 29 and 30.

In the brushless motor 6, the inner rotor 6b is mounted around the periphery of the motor axis 6a, a second outer stator 6c is placed around the inner rotor 6b, and a first outer stator 6d is placed around the second outer stator 6c. The first outer stator 6d is cylindrical and mounted on the inner circumferential surface of the motor case 28. The second outer stator 6c has an inner cylindrical portion 6e, from which nine of salient poles 6f radiate outward at the equal pitches. The outer ends of the salient poles 6f mate with the first outer stator 6d. The second outer stator 6c is a magnetic body of 9-pole circumferential armature windings 6g, in which each salient pole 6f is wound with the armature winding 6g. Each salient pole 6f is a fin with a given thickness. The inner rotor 6b is a rotor, which has 8 (8 poles) circumferential permanent magnets 6h. Eight permanent magnets 6h are magnetized in the radial direction (inward-outward direction) and arranged so that the north and south poles are positioned alternately in the circumferential direction. In the brushless motor 6, of the armature windings 6g wound on the 9 salient poles 6f, three adjacent poles are connected in series and assigned one phase to form three-phase (U phase, V phase and W phase) windings. In this connection, the first outer stator 6d and the second outer stator 6c form a pair of outer rotor. A gap 6i exists between the inner rotor 6b and the second outer stator 6c.

The motor case 28 houses the motor rotation detection means 13 at one end of the brushless motor 6. The motor rotation detection means 13 includes the layered core rotor 13a mounted on the motor axis 6a and the detection device 13b around the layered core rotor 13a. A cover 28a is mounted on the motor case 28 to cover the motor rotation detection means 13.

A case 28b for housing the drive unit 5 is mounted on the external circumferential surface of the motor case 28. The opening of the case 28b is closed by a cover 28d. The drive unit 5 thus is placed adjacent to the brushless motor 6 and the motor rotation detection means 13. A small opening 28e is provided on the side of the drive unit 5 of the motor case 28 to allow lead wires 5a and 5b to penetrate. The lead wire 5a is for supplying the brushless motor 6 with the current, which is connected to the output terminal of the drive unit 5 and the input terminal of the brushless motor 6. Also the lead wire 5b is for sending the motor rotation signal PMO, which is connected to the output terminal of the motor rotation detection means 13 and the input terminal of the drive unit 5. The drive unit 5 is placed adjacent to the brushless motor 6 and the motor rotation detection means 13, thereby shortening the lead wires 5a and 5b to result in the much shorter transmission path of signal (or supplied current) of the motor rotation signal PMO.

The torque limiter 10 is housed inside the side opening of the housing 20. The torque limiter 10 is a torque restriction mechanism, in which an inner member 10a of a male taper-like shape that is serration connected to the motor axis 6a of the brushless motor 6 is mated with an outer member 10b of a female taper-like (cup-like) shape that is serration connected to a worm axis 11a of the gear reduction mechanism 11. A disk spring 10d restricted by a nut 10c presses the inner member 10a. A holding ring 10e restricts the displacement of the outer member 10b. In this torque limiter 10, the internal circumferential surface of the outer member 10b can engage with the external circumferential surface of the inner member 10a with a given frictional force.

If a large torque exceeding a given value acts on the torque limiter 10, a slip will occur between the external circumferential surface of the inner member 10a and the internal circumferential surface of the outer member 10b. It thereby restricts the assist torque transferred to the gear reduction mechanism 11 from the brushless motor 6, eliminating an over-torque. Therefore, the torque limiter 10 prevents the brushless motor 6 from generating an excessive torque, not transferring it downstream of the torque limiter 10.

The gear reduction mechanism 11 is housed in the housing 20. The gear reduction mechanism 11 is a torque transfer means to transfer the assist torque generated by the brushless motor 6 to the pinion axis 7a, including a worm gear mechanism. The gear reduction mechanism 11 includes, the worm axis 11a connected to the motor axis 6a of the brushless motor 6 through the torque limiter 10, the worm gear 11b provided for the worm axis 11a and the worm wheel 11c connected to the pinion axis 7a.

The lead angles of the worm gear 11b and the worm wheel 11c are set a little larger than the friction angle. It is for allowing the motor axis 6a of the brushless motor 6 to rotate by the steering torque of the pinion axis 7a through the worm wheel 11c, the worm gear 11b and the worm axis 11a, when the brushless motor 6 is not in operation.

The worm axis 11a is positioned coaxial with the motor axis 6a and supported rotationally free with two bearings 11d and 11e of the housing 20. The bearing 11d closer to the motor axis 6a is mounted unable to displace in the axial direction and the bearing 11e remoter to the motor axis 6a is mounted able to displace in the axial direction on the housing 20. The displacement of the bearing 11d is restricted by a holding ring.

An adjusting bolt 11g presses the end surface of the outer ring of the bearing 11e with a plate spring 11f toward the motor axis 6a. An adjustment is made to eliminate the play in the axial direction of the worm axis 11a by pressing the bearings 11d and 11e with the adjusting bolt 11g and the plate spring 11f of a thin disk, thereby removing the backlash. The adjusting bolt 11g is adjustable with a lock nut 11h. It adjusts the displacement in the axial direction of the worm gear 11b, and maintains the engagement of the worm gear 11b and the worm wheel 11c with appropriate friction, thereby removing the backlash. In addition, the thermal expansion in the axial direction of the worm axis 11a can be absorbed by the elasticity of the plate spring 11f.

Figure 5:
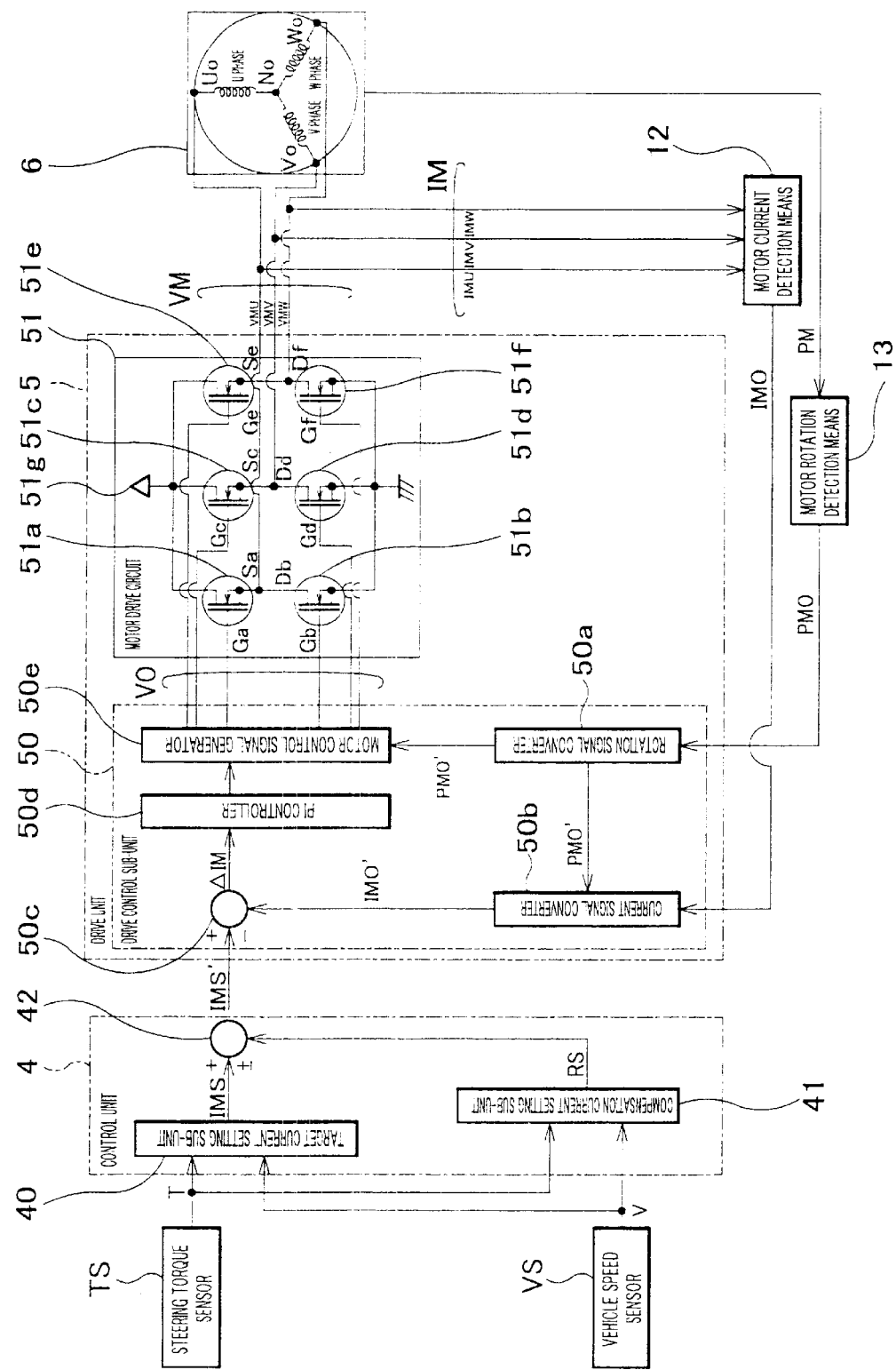
FIG. 5 is a block diagram showing the control unit and the drive unit according to the embodiment of the present invention.
Figure 6:
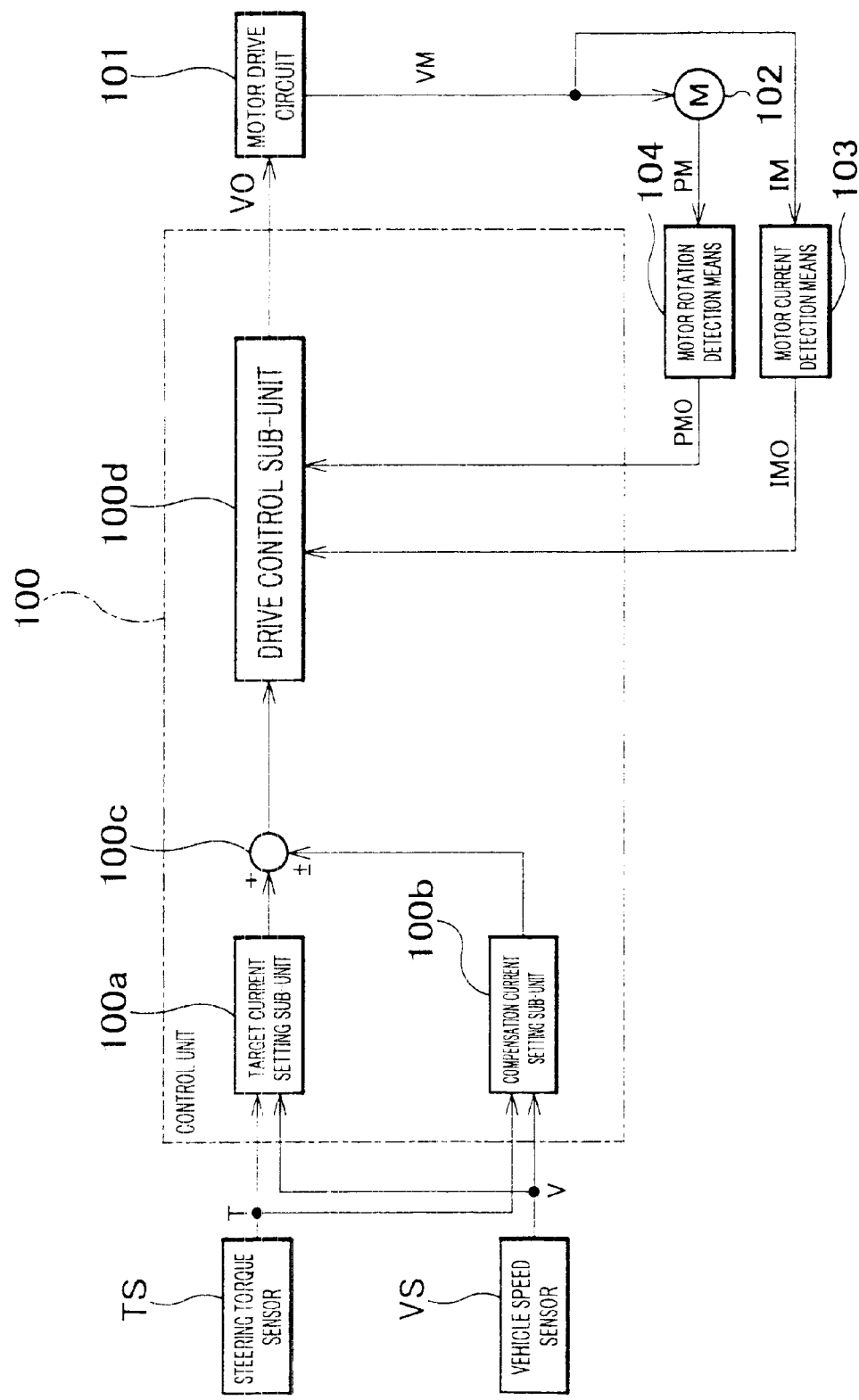
FIG. 6 is a block diagram showing the control unit of the electric power steering apparatus (prior art) with a brushless motor.

The structure of the control unit 4 will be described referring to FIG. 5. FIG. 5 is a block diagram showing the control unit and the drive unit.

The control unit 4 is placed on the external circumferential surface of the lid 22 along the pinion axis 7a and apart from the drive unit 5 (see FIG. 3). The control unit 4 is connected with the drive unit 5 electrically by the wire harness WH, through which the input/output of various signals is performed and the constant voltage power is supplied (see FIG. 2). The control unit 4 includes a one-tip microcomputer, input circuits of various sensors, output circuits of various signals and memories such as ROM for storing various maps. Though the control unit 4 is equipped with analogue circuits to shape the steering torque signal T, the reliability of which is susceptible to the effect of heat, the control unit 4 will not be affected adversely, since it is placed apart from the drive unit 5 including the motor drive circuit 51 which generates heat.

The control unit 4 determines the target motor current to be supplied to the brushless motor 6 according to the various detected signals of a vehicle. The control unit 4 includes a target current setting sub-unit 40, a compensation current setting sub-unit 41 and a compensator 42.

In this embodiment, the target current setting sub-unit 40 refers to the target current setting means according to the claims of the present invention.

The target current setting sub-unit 40 receives the steering torque signal T of the steering torque sensor TS and the vehicle speed signal V of the vehicle speed sensor VS, and sends the target current signal IMS to the compensator 42. The target current setting sub-unit 40 reads out the corresponding target current signal IMS with the steering torque signal T and the vehicle speed signal V as an address, which are shaped by the built-in analogue circuits, utilizing the map correlating the steering torque signal T and the vehicle speed signal V with the target current signal IMS, which is prepared based on the experimental or design values in advance. The target current signal IMS includes the information on the reference current for setting the target motor current to be supplied to the brushless motor 6. In this connection, the target current signal IMS is correlated with the vehicle speed signal V in a manner that it is large at low speed when the road reaction force is large and on the contrary small at high speed for the driving stability. The target current signal IMS is correlated with the steering torque signal T: the target current signal IMS equals zero when the steering torque signal T is in the vicinity of zero and the target current signal IMS increases with the steering torque signal T when the steering torque signal T exceeds a given value. The target current signal IMS will be set not more than the maximum target current since the brushless motor 6 limits the maximum current.

The compensation current setting sub-unit 41 receives the steering torque signal T of the steering torque sensor TS and the vehicle speed signal V of the vehicle speed sensor VS, and sends the compensation current signal RS to the compensator 42. The compensation current setting sub-unit 41 determines the compensation current signal RS for compensating the target current with inertia control and damping control in order to improve the steering feeling. The inertia control is performed in order to improve the steering response by determining an inertia compensation value according to the steering torque differentiation and the vehicle speed, and performing an addition compensation for the target current. On the other hand, the damping control is performed in order to improve the driving stability during steering by determining a damping compensation value according to the motor rotation speed and the vehicle speed, and performing a damping compensation for the target current. The compensation current setting sub-unit 41 differentiates the steering torque signal T to compute the differentiation of the steering torque with regard to time. The compensation current setting sub-unit 41 reads out the corresponding inertia compensation current signal with the differentiation of the steering torque with regard to time and the vehicle speed signal V as an address, utilizing the map correlating the differentiation of the steering torque with regard to time and the vehicle speed signal V with the inertia compensation current signal, which is prepared based on the experimental or design values in advance. Further, the compensation current setting sub-unit 41 reads out the corresponding damping compensation current signal with the vehicle speed signal V as an address, utilizing the map correlating the vehicle speed signal V with the damping compensation current signal, which is prepared based on the experimental or design values in advance. And the compensation current setting sub-unit 41 determines a compensation current signal RS according to the inertia compensation current signal and the damping compensation current signal.

The compensator 42 receives the target current signal IMS of the target current setting sub-unit 40 and the compensation current signal RS of the compensation current setting sub-unit 41 and sends the post-compensation target current signal IMS' to the drive unit 5. The compensator 42 computes the post-compensation target current signal IMS' by performing the addition or subtraction of the compensation current signal RS to or from the target current signal IMS, taking into consideration the rotational direction of the steering torque signal T etc.

The post-compensation target current signal IMS' is of a digital signal and sent in serial communication. The post-compensation target current signal IMS' may be another type of digital signal such as PWM signal instead of the digital signal sent in serial communication.

The structure of the drive unit 5 will be described referring to FIG. 5.

The drive unit 5 is placed adjacent to the brushless motor 6 mentioned before and apart from the control unit 4 (see FIG. 4). The drive unit 5 includes one-tip microcomputers, input circuits for various detection means, output circuits, constant voltage circuits, drive circuits and switching elements, etc.

The drive unit 5 determines the motor control signal VO according to the post-compensation target current signal IMS' of the control unit 4 and supplies the current to drive the brushless motor 6. Therefore, the drive unit 5 has a drive control sub-unit 50 and a motor drive circuit 51. The motor drive circuit 51, which generates heat, will not give rise to a problem, since the drive unit 5 is not equipped with an analogue circuit to shape the steering torque signal T, the reliability of which is susceptible to the effect of heat.

In this embodiment, the drive control sub-unit 50 refers to the drive control means and the motor drive circuit 51 refers to the motor drive means according to the claims of the present invention.

The drive control sub-unit 50 receives the post-compensation target current signal IMS' of the control unit 4, the motor current signal IMO of the motor current detection means 12 and the motor rotation signal PMO of the motor rotation detection means 13 and sends the motor control signal VO to the motor drive circuit 51. The drive control sub-unit 50 includes a rotation signal converter 50*a*, a current signal converter 50*b* and a deviation computing part 50*c*, a PI (Proportional Integral) controller 50*d* and a motor control signal generator 50*e*.

The rotation signal converter 50*a* receives the motor rotation signal PMO of the motor rotation detection means 13, and sends the digital motor rotation signal PMO' to the current signal converter 50*b* and the motor control signal generator 50*e*. The rotation signal converter 50*a* computes the rotational direction and angle with the motor rotation signal PMO of an analogue signal and converts it into the digital motor rotation signal PMO'. For example, the rotation signal converter 50*a* is composed of a RD (Resolver Digital) converter.

The current signal converter 50*b* receives the motor current signal IMO of the motor current detection means 12 and the motor rotation signal PMO' of the rotation signal converter 50*a*, and sends the motor current signal IMO' of a DC signal to the deviation computing part 50*c*. According to the motor current signal IMO of a three-phase AC signal and the rotational direction and angle of the motor rotation signal PMO', the current signal converter 50*b* converts the motor current signal IMO into the motor current signal IMO' of a DC signal, which represents the magnitude of the motor current and the rotation angle of the brushless motor 6.

The deviation computing part 50*c* receives the post-compensation target current signal IMS' of the control unit 4 and the motor current signal IMO' of the current signal converter 50*b*, and sends a deviation signal ΔIM to the PI controller 50*d*. The deviation computing part 50*c* subtracts the motor current signal IMO' from the post-compensation target current signal IMS' to generate the deviation signal ΔIM (=IMS'−IMO').

The PI controller 50*d* receives the deviation signal ΔIM of the deviation computing part 50*c* and sends a PI control signal to the motor control signal generator 50e. The PI controller performs the P (proportional) and I (integral) control for the deviation signal ΔIM to generate the PI control signal, which is representative of the current value of the motor current IM to be supplied to the brushless motor 6 and the rotational direction of the brushless motor 6, in order to reduce the deviation to zero.

The motor control signal generator 50e receives the motor rotation signal PMO' of the rotation signal converter 50a and the PI control signal of the PI controller 50d, and sends the motor control signal VO to the motor drive circuit 51. The motor control signal generator 50e determines the phase of winding, which is to be supplied with the motor current IM of the three phases (U phase, V phase and W phase), according to the actual rotation angle and direction of the motor rotation signal PMO'. Further, the motor control signal generator 50e generates the current value of the motor current IM to be supplied to the brushless motor 6, and either the PWM signal or the off signal, which corresponds to each phase (U phase, V phase and W phase), for the FET 51a through 51f of the motor drive circuit 51 respectively, according to the PI control signal. The motor control signal generator 50e selects the FET's of the FET 51a through 51f, to which the PWM signal is generated according to the information on the phase of winding to be supplied with the motor current IM based on the motor rotation signal PMO', and sets the duty ratio of the PWM signal according to the information on the current of the motor current IM provided by the PI control signal, thereby generating the motor voltage VM depending on the duty ratio.

The brushless motor 6 is composed of the three-phase winding of U phase, V phase and W phase. The inner rotor 6b (motor axis 6a) rotates by imposing the motor voltage VM (VMU, VMV and VMW) on each phase of terminal, Uo, Vo or Wo, and supplying the three-phase windings with a three-phase alternating current in the order of phase (see FIG. 4). The brushless motor 6 rotates in the positive or reverse direction by supplying the current in the order of U phase→V phase→W phase→U phase or U phase→W phase→V phase→U phase. The PI controller 50d judges the rotational direction of the brushless motor 6 and the current of the motor current IM with the deviation signal ΔIM. The motor control signal generator 50e decides the phase of winding, which is to be supplied with the current, according to the motor rotation signal PMO'.

The motor drive circuit 51 receives the motor control signal VO from the drive control sub-unit 50 and imposes the motor voltage VM on the brushless motor 6. The motor drive circuit 51 is composed of a bridge circuit with FET 51a, 51b, 51c, 51d, 51e and 51f, and supplied with 12 V of voltage by a power supply voltage 51g. Further, the motor drive circuit 51 is so arranged that the Uo terminal of the brushless motor 6 is connected to the connection of the source Sa of FET 51a and the drain Db of the FET 51b, the Vo terminal of the brushless motor 6 is connected to the connection of the source Sc of FET 51c and the drain Dd of the FET 51d and the Wo terminal of the brushless motor 6 is connected to the connection of the source Se of FET 51e and the drain Df of the FET 51f. The FET 51a through 51f are supplied with the PWM signal or the off signal at their respective gates Ga through Gf and turned on when the logical level is 1 with the input of the PWM signal. The motor voltage VM imposed on the brushless motor 6 is determined by the PWM signal duty ratio of the selectively PMW driven FET.

The function of the electric power steering apparatus 1 will now be described referring to the FIGS. 1 through 5.

The description will be made for the case where the steering wheel 3 is steered by a driver.

When a driver adds the steering force to the steering wheel 3, the steering torque sensor TS detects the steering torque representative of the magnitude of the steering force and the torque direction, and sends the steering torque signal T to the control unit 4.

In the control unit 4, the target current setting sub-unit 40 determines the target current signal IMS based on the steering torque signal T and the vehicle speed signal V, and the compensation current setting sub-unit 41 determines the compensation current signal RS on the basis of the steering torque signal T and the vehicle speed signal V. Further, the control unit 4 computes the post-compensation target current signal IMS' with the target current signal IMS and the compensation current signal RS. The control unit 4 sends the post-compensation target current signal IMS' to the drive unit 5 through the wire harness WH. The control unit 4 computes the post-compensation target current signal IMS' and sends it to the drive unit 5 at regular intervals.

Further, the motor rotation signal PMO is sent to the drive unit 5 by the motor rotation detection means 13 through the lead wire 5b.

In the drive unit 5, the deviation computing part 50c of the drive control sub-unit 50 computes the deviation signal ΔIM with the post-compensation target current signal IMS' and the post-conversion motor current signal IMO', which is converted by the current signal converter 50b. Further, the PI controller 50d of the drive control sub-unit 50 generates the PI signal with the deviation signal ΔIM, and the motor control signal generator 50e generates the motor control signal VO with the post-conversion motor rotation signal PMO' converted by the rotation signal converter 50a and the PI control signal, thereby sending the motor control signal VO to the motor drive circuit 51.

In the drive unit 5, FET 51a, 51b, 51c, 51d, 51e and 51f of the motor drive circuit 51 perform a selective PWM drive and impose the motor voltage VM on the Uo terminal, Vo terminal or Wo terminal of the brushless motor 6 according to the motor control signal VO through the lead wire 5a. The motor drive circuit 51 selects the FET's to be PWM driven of FET 51a, 51b, 51c, 51d, 51e and 51f alternately, and varies the imposed voltage of the motor drive voltage VM in order to drive the brushless motor 6 in the positive direction (or reverse direction) depending on the motor control signal VO.

In the brushless motor 6, the motor voltage VM is imposed on the winding of U phase, V phase or W phase, and the motor current IM is supplied. Then in the brushless motor 6, the inner rotor 6b is driven in the positive direction or the reverse direction, and the motor axis 6a rotates accordingly. At the same time, the motor current detection means 12 detects the motor drive current IM and sends the motor current signal IMO to the drive unit 5. The motor rotation detection means 13 detects the motor rotation angle PM of the inner rotor 6b and sends the motor rotation signal PMO to the drive unit 5 through the lead wire 5b.

Subsequently, the rotational drive force of the motor axis 6a of the brushless motor 6 is transferred to the pinion axis 7a through the torque limiter 10 and the gear reduction mechanism 11. This rotational drive force acts on the pinion axis 7a as assist torque to assist the steering torque (steering force) of a driver, thereby relaxing the steering force of the driver.

The flow of the signals (or supplied currents) starting with the motor rotation signal PMO of the motor rotation detection means 13 is: the motor rotation detection means 13→the lead wire 5b→the drive unit 5→the lead wire 5a→the brushless motor 6. Since the motor rotation detection means 13 is placed adjacent to the drive unit 5, the time required for signal transmission between them is almost zero. The brushless motor can be controlled accurately as the motor rotation signal PMO detected by the motor rotation detection means 13 is reflected on the control of the brushless motor 6 without a phase lag. Therefore, the output of the brushless motor 6 is stabilized free from an oscillation.

The electric power steering apparatus 1 is capable of preventing the degradation of the steering feeling due to the abrasion of brush by employing the brushless motor 6. Also the electric power steering apparatus 1 achieves no degradation of steering feeling due to the large moment of inertia caused by an outer rotor, since the brushless motor 6 employs the inner rotor 6b instead of the outer rotor.

The electric power steering apparatus 1 enables the analogue circuit, which is for shaping the steering torque signal T of the control unit 4, to be free from the adverse effect by the heat generated by the motor drive circuit 51, since the control unit 4 and the drive unit 5 are placed apart each other. Because the control unit 4 can set the post-compensation target current signal IMS' without the heat effect, the high reliability of the control unit 4 can be maintained.

The electric power steering apparatus 1 requires almost no time for sending the signal from the motor rotation detection means 13 to the drive unit 5, and supplying the current from the drive unit 5 to the brushless motor 6, since the drive unit 5 is placed adjacent to the brushless motor 6 and the motor rotation detection means 13. Thus the detected signal of the motor rotation angle PM of the inner rotor 6b is used in the drive control of the brushless motor 6 without a phase lag, resulting in an accurate control of the brushless motor 6. As a result, the output of the brushless motor 6 is stabilized and the comfortable steering feeling is attained.

The electric power steering apparatus 1 almost dispenses with the voltage drop of the lead wire 5a at supplying the current to the brushless motor 6, resulting in almost no output drop of the brushless motor 6, since the lead wire 5a between the motor drive circuit 51 and the brushless motor 6 is very short. As a result, the output of the brushless motor 6 is stabilized and the comfortable steering feeling can be attained.

It will now be appreciated from the foregoing description that the present invention is not limited to the particular illustrated embodiment discussed above and may be carried out in various modified forms.

Though in this embodiment the control unit is, for example, placed along the pinion axis, the position is not limited to it. The control unit may be placed so apart from the drive unit as to be free from the heat effect of the drive unit. The position of the drive unit is not limited either, and it may be placed freely as long as it has no heat effect on the control unit, preferably in the vicinity of the brushless motor.

In this embodiment the assist torque acts on the pinion axis with the brushless motor, however, the assist torque acting on the rack axis is an alternative.

In this embodiment the motor rotation detection means detects the rotation angle of the brushless motor; however it may be so arranged that a motor rotation detection means detects the rotational phase, the rotational speed or the rotational acceleration of the brushless motor, and the brushless motor is controlled depending on the rotational phase signal, the rotational speed signal or the rotational acceleration signal.

What is claimed is:

1. An electric power steering apparatus, comprising:
   a brushless motor for adding assist torque to a steering system;
   a steering torque detection means for detecting steering torque acting on the steering system and outputting a steering torque signal;
   a motor rotation detection means for detecting a rotation of the brushless motor and outputting a motor rotation signal;
   a motor current detection means for detecting a motor current, which flows in the brushless motor, and outputting a motor current signal;
   a target current setting means for setting a target current based on at least the steering torque signal and outputting a target current signal;
   a drive control means for outputting a motor control signal after receiving and processing at least the target current signal, the motor current signal and the motor rotation signal; and
   a motor drive means for driving the brushless motor based on the motor control signal, wherein said target current setting means and said drive control means are placed apart in order to manage temperature of said target current setting means and electrically connected to each other with a communication line.

2. The electric power steering apparatus according to claim 1, wherein said drive control means and said motor drive means are placed adjacent to said brushless motor.

3. The electric power steering apparatus according to claim 2, wherein a motor control means and said motor drive means are housed in a case which is mounted on the external circumferential surface of a motor case.

4. The electric power steering apparatus according to claim 1, wherein said target current setting means is placed along a steering axis.

5. The electric power steering apparatus according to claim 1, wherein said brushless motor drives a pinion.

6. The electric power steering apparatus according to claim 2, wherein said brushless motor drives a pinion.

7. The electric power steering apparatus according to claim 3, wherein said brushless motor drives a pinion.

8. The electric power steering apparatus according to claim 4, wherein said brushless motor drives a pinion.

* * * * *